US011922889B2

(12) United States Patent
Park et al.

(10) Patent No.: US 11,922,889 B2

(45) **Date of Patent: *Mar. 5, 2024**

(54) DISPLAY APPARATUS

(71) Applicant: SAMSUNG DISPLAY CO., LTD., Yongin-si (KR)

(72) Inventors: Hyungkeun Park, Yongin-si (KR); Jungtaek Kim, Yongin-si (KR); Kyunho Kim, Yongin-si (KR); Joonsuk Baik, Yongin-si (KR); Sekeun Lee, Yongin-si (KR); Sangsu Han, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,174

(22) Filed: Dec. 1, 2022

(65) Prior Publication Data

US 2023/0092540 A1 Mar. 23, 2023

Related U.S. Application Data

(63) Continuation of application No. 17/345,505, filed on Jun. 11, 2021, now Pat. No. 11,538,419.

(30) Foreign Application Priority Data

Sep. 10, 2020 (KR) ........................ 10-2020-0116238

(51) Int. Cl.

*G09G 3/3275* (2016.01)
*G09G 3/3233* (2016.01)

(52) U.S. Cl.

CPC ......... *G09G 3/3275* (2013.01); *G09G 3/3233* (2013.01); *G09G 2310/0291* (2013.01);

(Continued)

(58) Field of Classification Search

CPC .... G09G 3/3233; G09G 3/006; G09G 3/3275; G09G 2300/0842; G09G 2300/0819;

(Continued)

(56) References Cited

U.S. PATENT DOCUMENTS

2004/0178973 A1* 9/2004 Miller .................. H10K 59/351 345/82
2014/0347257 A1 11/2014 Igawa (Continued)

FOREIGN PATENT DOCUMENTS

KR 1020140137178 A 12/2014
KR 1020170079330 A 7/2017

(Continued)

*Primary Examiner* — Dong Hui Liang

(74) *Attorney, Agent, or Firm* — CANTOR COLBURN LLP

(57) ABSTRACT

A display apparatus includes a display panel in which a plurality of pixels and a plurality of data lines and a plurality of sensing lines connected to the pixels are arranged, a first driving circuit connected to data lines and sensing lines arranged in a first pixel column and a second pixel column adjacent to the first pixel column, and a second driving circuit connected to data lines and sensing lines arranged in a third pixel column adjacent to the second pixel column and a fourth pixel column adjacent to the third pixel column.

13 Claims, 14 Drawing Sheets

(52) U.S. Cl.
CPC . *G09G 2310/08* (2013.01); *G09G 2320/0233* (2013.01); *G09G 2320/029* (2013.01); *G09G 2320/045* (2013.01); *G09G 2330/10* (2013.01)

(58) Field of Classification Search
CPC ..... G09G 2300/0426; G09G 2320/043; G09G 2320/045; G09G 2320/0295; G09G 2320/0233; G09G 2310/0297; G09G 2310/027
See application file for complete search history.

(56) References Cited

U.S. PATENT DOCUMENTS

| | | | | |
|---|---|---|---|---|
| 2017/0004776 | A1* | 1/2017 | Park | G09G 3/3233 |
| 2019/0228726 | A1 | 7/2019 | Ono | G09G 3/3291 |
| 2020/0084899 | A1 | 3/2020 | Kang et al. | |
| 2020/0105195 | A1 | 4/2020 | Song | G09G 3/3291 |
| 2020/0343330 | A1 | 10/2020 | Kwon et al. | |
| 2021/0043148 | A1* | 2/2021 | Lee | G09G 3/3291 |

FOREIGN PATENT DOCUMENTS

| | | | |
|---|---|---|---|
| KR | 101780506 | B1 | 9/2017 |
| KR | 102039024 | B1 | 10/2019 |
| KR | 1020200029683 | A | 3/2020 |
| KR | 1020200124795 | A | 11/2020 |

* cited by examiner

DISPLAY APPARATUS

This application is a continuation of U.S. patent application Ser. No. 17/345,505, filed on Jun. 11, 2021, which claims priority to Korean Patent Application No. 10-2020-0116238, filed on Sep. 10, 2020, and all the benefits accruing therefrom under 35 U.S.C. § 119, the content of which in its entirety is herein incorporated by reference.

BACKGROUND

1. Field

One or more embodiments relate to display apparatuses.

2. Description of Related Art

A display apparatus may display an image by using a display panel including a plurality of scan lines and data lines and a plurality of pixels connected thereto. The pixels may receive a data signal from the data lines in response to a scan signal supplied from the scan lines and emit light with a brightness corresponding to the data signal.

SUMMARY

One or more embodiments include a display apparatus capable of improving image quality by effectively compensating for a characteristic deviation of pixels. However, these problems are merely examples and the scope of the disclosure is not limited thereto.

Additional aspects will be set forth in part in the description which follows and, in part, will be apparent from the description, or may be learned by practice of the presented embodiments.

According to one or more embodiments, a display apparatus includes a plurality of pixels, a plurality of sensing lines connected to the pixels, a first sensor connected to a first odd sensing line arranged in a first odd pixel column and a first even sensing line arranged in a first even pixel column among the plurality of sensing lines, and a second sensor connected to a second odd sensing line arranged in a second odd pixel column and a second even sensing line arranged in a second even pixel column among the plurality of sensing lines, wherein a pair of the first odd sensing line and the first even sensing line connected to the first sensor and a pair of the second odd sensing line and the second even sensing line connected to the second sensor are alternately arranged in a first direction.

The first sensor and the second sensor may extract characteristic information of the plurality of pixels.

The characteristic information may include at least one of threshold voltage, mobility, and degradation information of a driving transistor and an organic light emitting diode included in each of the plurality of pixels.

The display apparatus may further include a compensator which converts first data into second data based on sensing data corresponding to the characteristic information.

The compensator may generate sensing data of an unsensing pixel among the plurality of pixels, based on sensing data of pixels adjacent to the unsensing pixel among the plurality of pixels, and the unsensing pixel is a pixel of which the characteristic information is not extracted by the first sensor and the second sensor.

The first sensor may be mounted on a first circuit board of a film type, and the second sensor may be mounted on a second circuit board of a film type.

The display apparatus may further include a first data driver mounted on the first circuit board and connected to a data line arranged in the first odd pixel column and a data line arranged in the first even pixel column, and a second data driver mounted on the second circuit board and connected to a data line arranged in the second odd pixel column and a data line arranged in the second even pixel column.

The first sensor may include a first amplifier selectively connected to the first odd sensing line and the first even sensing line, and the second sensor may include a second amplifier selectively connected to the second odd sensing line and the second even sensing line.

A timing at which the first odd sensing line is connected to the first amplifier may be equal to a timing at which the second odd sensing line is connected to the second amplifier, and a timing at which the first even sensing line is connected to the first amplifier may be equal to a timing at which the second even sensing line is connected to the second amplifier.

Each of the plurality of pixels may include a first pixel and a second pixel that emit light in different colors and are arranged adjacent to each other in the first direction, and each of the plurality of sensing lines may be selectively connected to the first pixel and the second pixel.

According to one or more embodiments, a display apparatus includes a display panel in which a plurality of pixels and a plurality of data lines and a plurality of sensing lines connected to the pixels are arranged, a first driving circuit connected to data lines of the plurality of data lines and sensing lines of the plurality of sensing lines arranged in a first pixel column and a second pixel column adjacent to the first pixel column, and a second driving circuit connected to data lines of the plurality of data lines and sensing lines of the plurality of sensing lines arranged in a third pixel column adjacent to the second pixel column and a fourth pixel column adjacent to the third pixel column.

The first driving circuit and the second driving circuit may extract characteristic information of the plurality of pixels from the sensing lines.

The characteristic information may include at least one of threshold voltage, mobility, and degradation information of a driving transistor and an organic light emitting diode included in each of the plurality of pixels.

The display apparatus may further include a compensator which converts first data into second data based on sensing data corresponding to the characteristic information.

The compensator may generate sensing data of an unsensing pixel among the plurality of pixels, based on sensing data of pixels adjacent to the unsensing pixel among the plurality of pixels, and the unsensing pixel is a pixel of which the characteristic information is not extracted by the first sensor and the second sensor.

The first driving circuit and the second driving circuit may output a data signal corresponding to the second data to the plurality of pixels.

The first driving circuit may be mounted on a first circuit board of a film type, and the second driving circuit may be mounted on a second circuit board of a film type.

The first driving circuit may include a first amplifier selectively connected to a sensing line arranged in the first pixel column and a sensing line arranged in the second pixel column of the plurality of sensing lines, and the second driving circuit may include a second amplifier selectively connected to a sensing line arranged in the third pixel column and a sensing line arranged in the fourth pixel column of the plurality of sensing lines.

A timing at which the sensing line arranged in the first pixel column is connected to the first amplifier may be equal to a timing at which the sensing line arranged in the third pixel column is connected to the second amplifier, and a timing at which the sensing line arranged in the second pixel column is connected to the first amplifier may be equal to a timing at which the sensing line arranged in the fourth pixel column is connected to the second amplifier.

Each of the plurality of pixels may include a first pixel and a second pixel that emit light in different colors and are arranged adjacent to each other in a row direction, and each of the plurality of sensing lines may be selectively connected to the first pixel and the second pixel.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
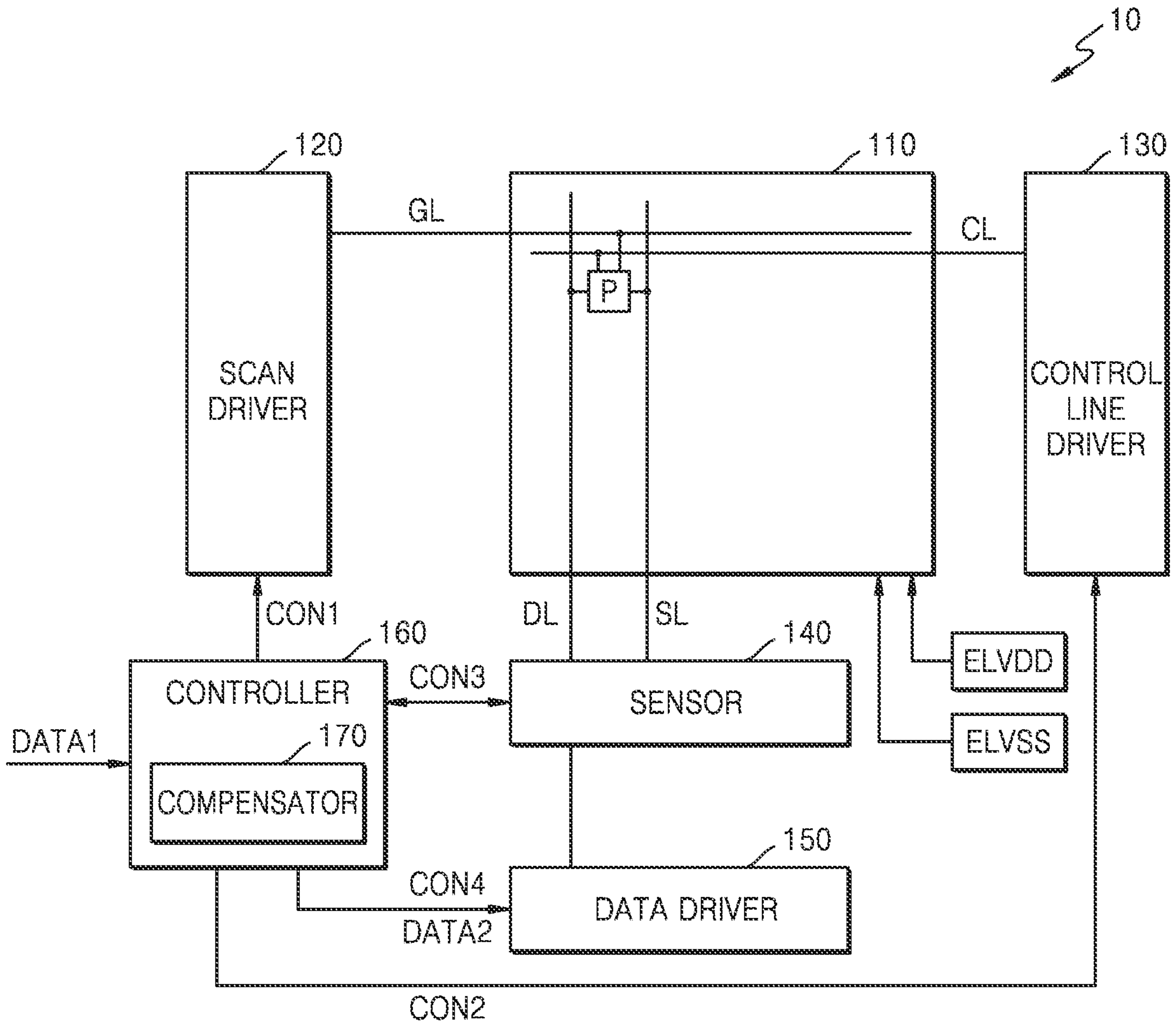
FIG. 1 is a block diagram schematically illustrating a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The disclosure may include various embodiments and modifications, and certain embodiments thereof are illustrated in the drawings and will be described herein in detail. The effects and features of the disclosure and the accomplishing methods thereof will become apparent from the embodiments described below in detail with reference to the accompanying drawings. However, the disclosure is not limited to the embodiments described below and may be embodied in various modes.

It will be understood that although terms such as "first" and "second" may be used herein to describe various elements, these components should not be limited by these terms and these terms are only used to distinguish one element from another element.

As used herein, the singular forms "a," "an," and "the" are intended to include the plural forms as well, unless the context clearly indicates otherwise.

Also, it will be understood that the terms "comprise," "include," and "have" used herein specify the presence of stated features or elements, but do not preclude the presence or addition of one or more other features or elements.

It will be understood that when a layer, region, or element is referred to as being "on" another layer, region, or element, it may be "directly on" the other layer, region, or element or may be "indirectly on" the other layer, region, or element with one or more intervening layers, regions, or elements therebetween.

Sizes of elements in the drawings may be exaggerated for convenience of description. In other words, because the sizes and thicknesses of elements in the drawings are arbitrarily illustrated for convenience of description, the disclosure according to the invention is not limited thereto.

As used herein, "A and/or B" represents the case of A, B, or A and B. Also, "at least one of A and B" represents the case of A, B, or A and B.

In the following embodiments, the meaning of a line "extending in a first direction or a second direction" may include not only extending in a linear shape but also extending in a zigzag or curved shape along the first direction or the second direction.

In the following embodiments, when referred to as "in a plan view," it may mean that a target portion is viewed from above, and when referred to as "in a cross-sectional view," it may mean that a cross-section of a target portion vertically cut is viewed from side. In the following embodiments, when a first element "overlaps" a second element, the first element may be located over or under the second element.

In the following embodiments, when X and Y are connected to each other, X and Y may be electrically connected to each other, X and Y may be functionally connected to each other, or X and Y may be directly connected to each other. Here, X and Y may be target objects (e.g., apparatuses, devices, circuits, lines, electrodes, terminals, conductive layers, or layers). Thus, the disclosure is not limited to a certain connection relationship, for example, a connection relationship indicated in the drawings or the detailed description, and may also include anything other than the connection relationship indicated in the drawings or the detailed description.

For example, when X and Y are electrically connected to each other, one or more devices (e.g., switches, transistors, capacitors, inductors, resistors, or diodes) enabling the electrical connection between X and Y may be connected between X and Y.

In the following embodiments, "ON" used in connection with a device state may refer to an activated state of the device, and "OFF" may refer to a deactivated state of the device. "ON" used in connection with a signal received by a device may refer to a signal activating the device, and "OFF" may refer to a signal deactivating the device. The device may be activated by a high-level voltage or a low-level voltage. For example, a P-channel transistor may be activated by a low-level voltage, and an N-channel transistor may be activated by a high-level voltage. Thus, it should be understood that "ON" voltages for the P-channel transistor and the N-channel transistor are opposite (low versus high) voltage levels.

FIG. 1 is a block diagram schematically illustrating a display apparatus according to an embodiment.

A display apparatus 10 according to embodiments may be implemented as an electronic apparatus such as a smart phone, a mobile phone, a smart watch, a navigation apparatus, a game machine, a television ("TV"), a vehicle head unit, a notebook computer, a laptop computer, a tablet computer, and a personal media player ("PMP"), or a personal digital assistant ("PDA"). Also, the electronic apparatus may be a flexible apparatus.

Referring to FIG. 1, the display apparatus 10 may include a display panel 110, a scan driver 120, a control line driver 130, a sensor 140, a data driver 150, and a controller 160. In FIG. 1, the display panel 110 is illustrated as being separate from driving circuits such as the scan driver 120; however, the disclosure according to the invention is not limited thereto. For example, at least one of the scan driver 120, the control line driver 130, the sensor 140, and the data driver 150 may be integrated on the display panel 110 in another embodiment.

According to an embodiment, the display apparatus 10 may be driven by being divided into a sensing period and a driving period. The sensing period may be a period of extracting characteristic information of each of pixels P provided in the display panel 110, for example, at least one of the threshold voltage, mobility, and degradation information of a driving transistor and/or an organic light emitting diode included in each of the pixels P. The driving period may be a period for displaying a certain image in response to a data signal.

The scan driver 120 may be connected to a plurality of scan lines GL and may generate a scan signal in response to a first control signal CON1 received from the controller 160 and sequentially supply the scan signal to the scan lines GL. The scan driver 120 may include a shift register. For example, the scan driver 120 may sequentially supply the scan signal to the scan lines GL during the sensing period and the driving period. In an embodiment, the scan driver 120 may supply the scan signal to the scan lines GL only during the driving period. The scan signal may be set to an on-voltage at which the transistor included in the pixel P may be turned on. The on-voltage may be a high-level or low-level voltage.

The control line driver 130 may be connected to a plurality of control lines CL and may supply a control signal to the control lines CL during the sensing period in response to a second control signal CON2 received from the controller 160. For example, the control line driver 130 may sequentially supply the control signal to the control lines CL during the sensing period. The control signal may be set to an on-voltage at which the transistor included in the pixel P may be turned on. The on-voltage may be a high-level or low-level voltage. The pixels P receiving the control signal may be electrically connected to the sensing lines SL.

In FIG. 1, the control line driver 130 is provided as a separate driver; however, in other embodiments, the scan driver 120 may supply the control signal to the control lines CL in place of the control line driver 130. Alternatively, instead of forming a separate control line CL, the scan line GL may be used to control the connection between the pixels P and the sensing lines SL during the sensing period.

The sensor 140 may be connected to a plurality of sensing lines SL and may sense characteristic information from the pixels P through the sensing lines SL during the sensing period in response to a third control signal CON3 received from the controller 160. In an embodiment, the sensing line SL may be provided for each pixel column. In other embodiments, a plurality of pixels P of a plurality of pixel columns may share one sensing line SL as described below with reference to FIG. 4.

The sensor 140 may convert the sensed characteristic information into sensing data in digital form and output the same. For this purpose, the sensor 140 may include at least one analog-to-digital converter ("ADC"). The sensing data output from the sensor 140 may be stored in a memory (not illustrated) by the controller 160 or the like. The stored sensing data may be used to convert first data DATA1 into second data DATA2 to compensate for a characteristic deviation of the pixels P. For this purpose, the sensing data corresponding to all the pixels P provided in the display panel 110 may be stored in the memory during the sensing period. The sensor 140 may further perform IC calibration, defect filtering, edge filtering, or the like for sensing data correction.

In an embodiment, the sensor 140 may generate sensing data by sensing characteristic information of all the pixels P. In other embodiments, the sensor 140 may not sense characteristic information of some pixels P. In this case, characteristic information of a pixel P on which characteristic information is not sensed by the sensor 140 may be calculated with reference to characteristic information of adjacent pixels P. In an embodiment, the compensator 170 of the controller 160 may calculate characteristic information of a pixel P on which characteristic information is not sensed, with reference to characteristic information of adjacent pixels P. In this case, the compensator 170 may perform IC calibration, defect filtering, edge filtering, or the like for sensing data correction.

The data driver 150 may be connected to a plurality of data lines DL and may supply a data signal to the data lines DL during the driving period in response to a fourth control signal CON4 received from the controller 160. The data driver 150 may generate a data signal during the driving period in response to the second data DATA2 supplied from the controller 160. The second data DATA2 may be a value based on the first data DATA1 input from the outside as an image to be displayed on the display panel 110 and may particularly be a value obtained by changing the first data DATA1 to compensate for a characteristic deviation of the pixels P. The data signal in the form of a voltage or current generated by the data driver 150 may be supplied to the data lines DL. The data signal supplied to the data lines DL may be supplied to the pixels P selected by the scan signal. The pixels P may emit light with a brightness corresponding to the data signal during the driving period, and accordingly, an image may be displayed on the display panel 110.

According to an embodiment, the data driver 150 may supply a reference voltage to the data lines DL during the sensing period in response to the control of the controller 160. For example, the reference voltage may be set to a certain voltage at which a current may flow in the driving transistors provided in the pixels P. Moreover, in embodiments, the data driver 150 may not necessarily have to supply the reference voltage to the pixels P during the sensing period. For example, when the pixels P are connected to other voltage sources and/or current sources during the sensing period, the data driver 150 may drive the data lines DL only during the driving period.

The display panel 110 may include a plurality of scan lines GL, a plurality of data lines DL, a plurality of control lines CL, a plurality of sensing lines SL, and a plurality of pixels P connected thereto. The plurality of pixels P may be repeatedly arranged in a first direction (x direction or row direction in FIG. 4) and a second direction (y direction or column direction in FIG. 4). The plurality of scan lines GL may be spaced at certain intervals and arranged in rows and may each transmit a scan signal. The plurality of control lines CL may be spaced at certain intervals and arranged in rows and may each transmit a control signal. The plurality of data lines DL may be spaced at certain intervals and arranged in columns and may each transmit a data signal. The plurality of sensing lines SL may be spaced at certain intervals and arranged in columns and may each sense characteristic information of the pixel P. According to embodiments, when the display panel 110 is a display panel of an organic electroluminescence ("EL") display apparatus, the pixels P of the display panel 110 may be driven by being supplied with a driving voltage ELVDD and a common voltage ELVSS.

The controller 160 may control the driving of the scan driver 120, the control line driver 130, the sensor 140, and the data driver 150. Also, the controller 160 may store the sensing data received from the sensor 140 in the memory and may generate the second data DATA2 by converting the first data DATA1 input from the outside by using the stored sensing data. The generated second data DATA2 may be output to the data driver 150. In an embodiment, the first data DATA1, the second data DATA2, and the sensing data may be digital signals. For example, the controller 160 may change a bit value of the first data DATA1 by using the sensing data and output the result thereof as the second data DATA2.

The controller 160 may include a compensator 170. However, the disclosure is not limited thereto. For example, in other embodiments, a compensator 170 may be separately configured outside the controller 160, and the compensator 170 may convert the first data DATA1 to generate the second data DATA2.

The compensator 170 may receive the first data DATA1 and the sensing data and generate the second data DATA2 in response thereto. A plurality of ADCs may be included in the sensor 140, and the compensator 170 may set a correction value by comparing the output values of the ADCs. The compensator 170 may convert the first data DATA1 into the second data DATA2 by reflecting the sensing data and the correction value. For example, the compensator 170 may generate the second data DATA2 by changing a bit value of the first data DATA1 input from the outside by using the sensing data and the correction value. The second data DATA2 generated by the compensator 170 may be output to the data driver 150, and the data driver 150 may generate a data signal corresponding to the second data DATA2 and output the generated data signal to the pixels P through the data lines DL.

Hereinafter, an organic light emitting display apparatus will be described as an example of the display apparatus according to an embodiment; however, the display apparatus of the disclosure is not limited thereto. In other embodiments, the display apparatus of the disclosure may be a display apparatus such as an inorganic light emitting display apparatus (or inorganic EL display apparatus) or a quantum dot light emitting display apparatus.

Figure 2:
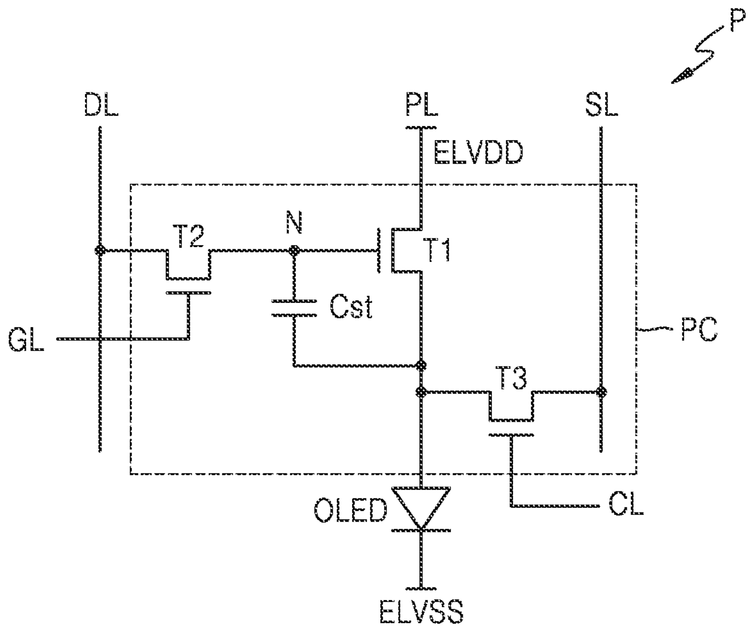
FIG. 2 is an equivalent circuit diagram illustrating a pixel according to an embodiment.

FIG. 2 is an equivalent circuit diagram illustrating a pixel according to an embodiment.

Referring to FIG. 2, each of the pixels P may include a pixel circuit PC and an organic light emitting diode OLED as a display element connected to the pixel circuit PC. The pixel circuit PC may include a first transistor T1 (i.e., driving transistor), a second transistor T2 (i.e., switching transistor), a third transistor T3 (i.e., sensing control transistor), and a capacitor Cst.

The first transistor T1 may include a first electrode connected to a driving voltage line PL for supplying a driving voltage ELVDD and a second electrode connected to a first electrode (e.g., pixel electrode) of the organic light emitting diode OLED. A gate electrode of the first transistor T1 may be connected to a node N. The first transistor T1 may control a driving current flowing from the driving voltage line PL through the organic light emitting diode OLED, in response to a voltage stored in the capacitor Cst. The organic light emitting diode OLED may emit light with a certain brightness according to the driving current.

The second transistor T2 may include a gate electrode connected to a scan line GL, a first electrode connected to a data line DL, and a second electrode connected to the node N. The second transistor T2 may be turned on according to a scan signal input through the scan line GL to electrically connect the data line DL to the node N and transmit a data signal input through the data line DL to the node N.

The third transistor T3 may include a gate electrode connected to a control line CL, a first electrode connected to the second electrode of the first transistor T1, and a second electrode connected to a sensing line SL. The third transistor T3 may be turned on by a control signal supplied through the control line CL during the sensing period to electrically connect the sensing line SL to the second electrode of the first transistor T1.

The capacitor Cst may be connected between the node N and the second electrode of the first transistor T1. The capacitor Cst may store a voltage corresponding to the difference between the voltage received from the second transistor T2 and the potential of the second electrode of the first transistor T1.

In FIG. 2, N-type transistors are illustrated as the transistors of the pixel circuit; however, embodiments according to the invention are not limited thereto. For example, according to various embodiments, the transistors of the pixel circuit PC may be P-type transistors, or some of the transistors may be P-type transistors and others of the transistors may be N-type transistors.

The brightness of the pixel P may be mainly determined according to the data signal. However, a characteristic value of the first transistor T1 and/or the organic light emitting diode OLED may be additionally reflected in the brightness of the pixel P. Also, the characteristic values of the first transistor T1 and/or the organic light emitting diode OLED may vary according to the use time thereof.

Thus, in embodiments, an external compensation method may be applied in which characteristic information of the pixel P is sensed during the sensing period by using the third transistor T3 and input data, that is, the first data DATA1, is changed by reflecting the characteristic information sensed for each pixel P. Accordingly, an image of uniform quality may be displayed.

More particularly, the pixel P may output characteristic information through the sensing line SL during a sensing period and emit light during a driving period in response to the data signal supplied from the data line DL.

According to embodiments, a process of sensing the characteristic information of the pixel P may be performed at least once before shipment of the display apparatus. Accordingly, initial characteristic information of the pixel P may be prestored and the same may be used to correct the input data to compensate for a characteristic deviation between the pixels P provided in the display panel 110. Accordingly, the display panel 110 may display an image of uniform quality.

Also, according to embodiments, an operation of sensing the characteristic information of the pixel P may be performed every sensing period during actual use of the display apparatus. Accordingly, even when a characteristic deviation between the pixels P occurs according to the usage thereof, the changed characteristic information of the pixels P may be updated in real time and reflected in generation of a data signal. Thus, an image of uniform quality may be displayed on the display panel 110.

Figure 3:
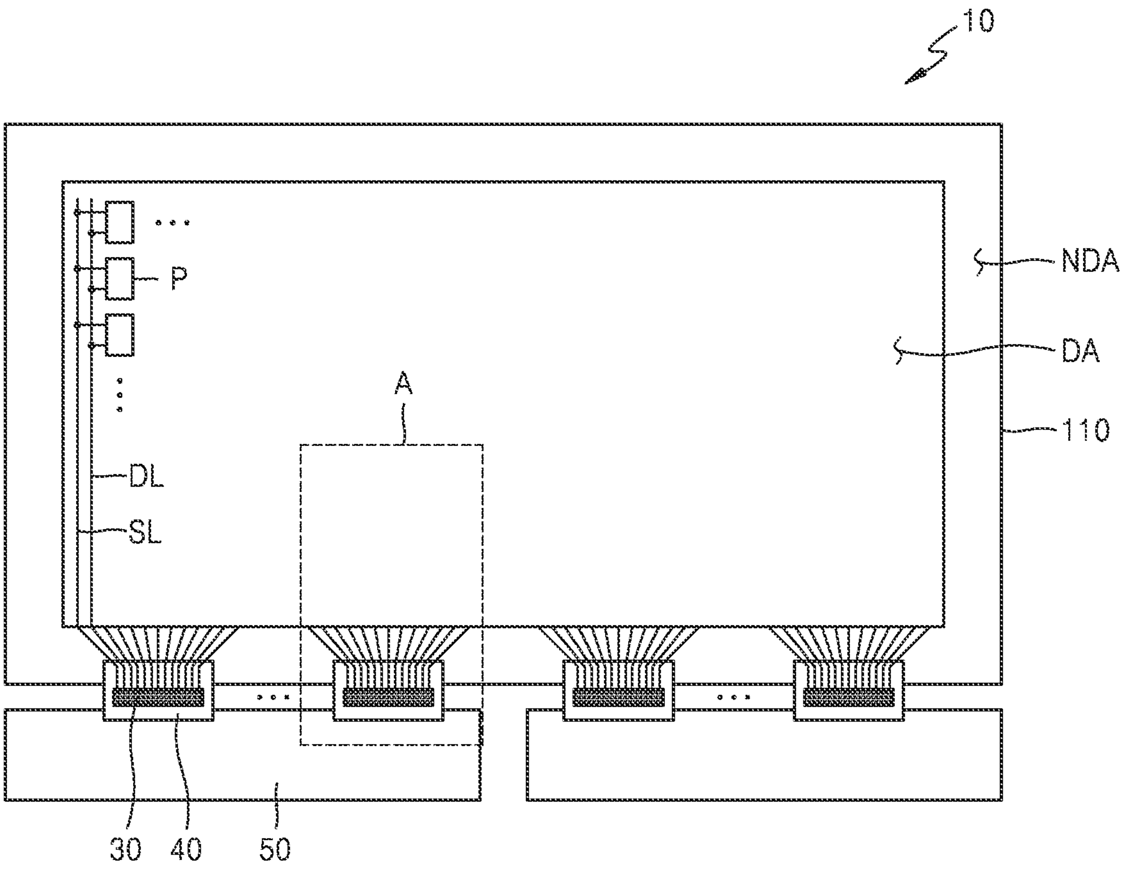
FIG. 3 is a block diagram illustrating a display apparatus according to an embodiment.
Figure 4:
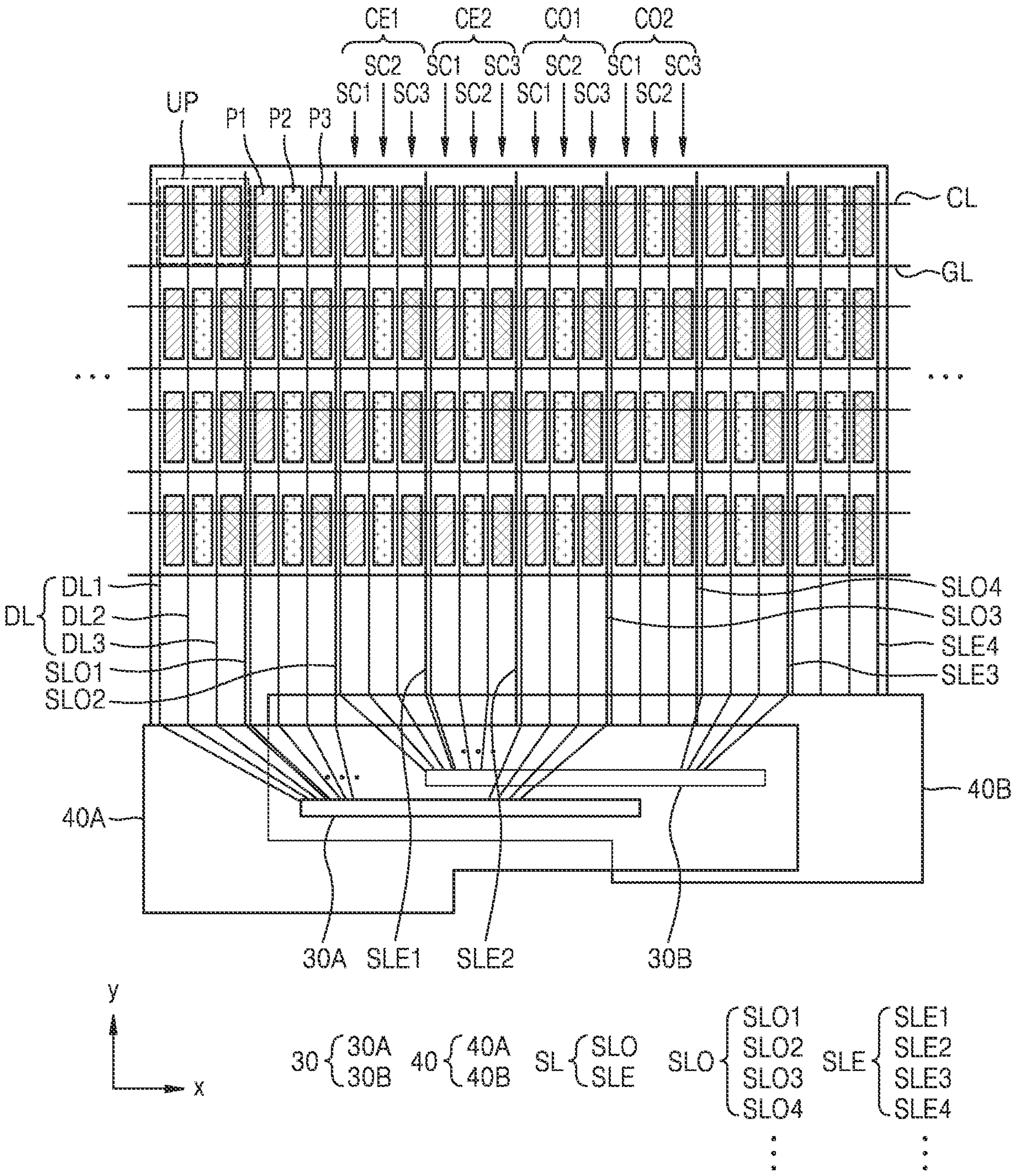
FIG. 4 is a diagram schematically illustrating a portion of FIG. 3.
Figure 5A:
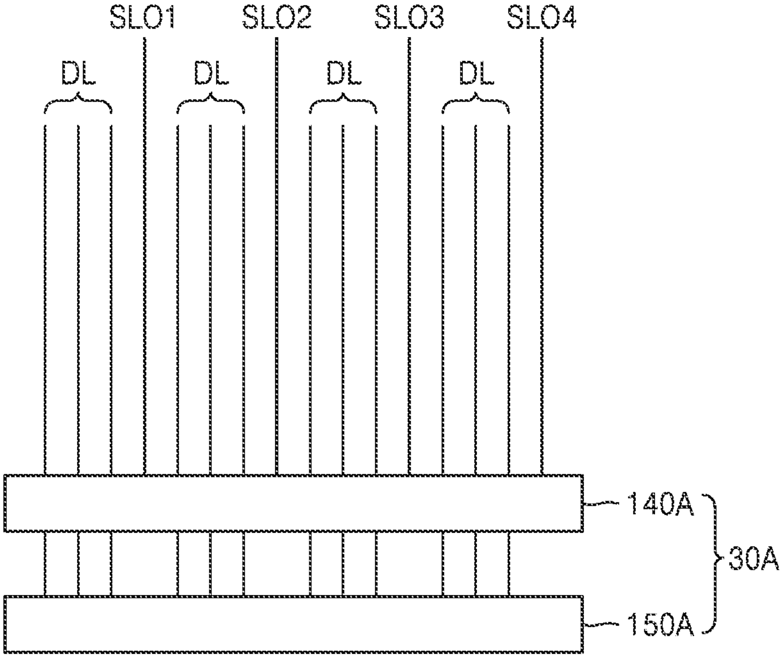
FIGS. 5A and 5B are diagrams schematically illustrating a driving circuit of FIG. 4.
Figure 5B:
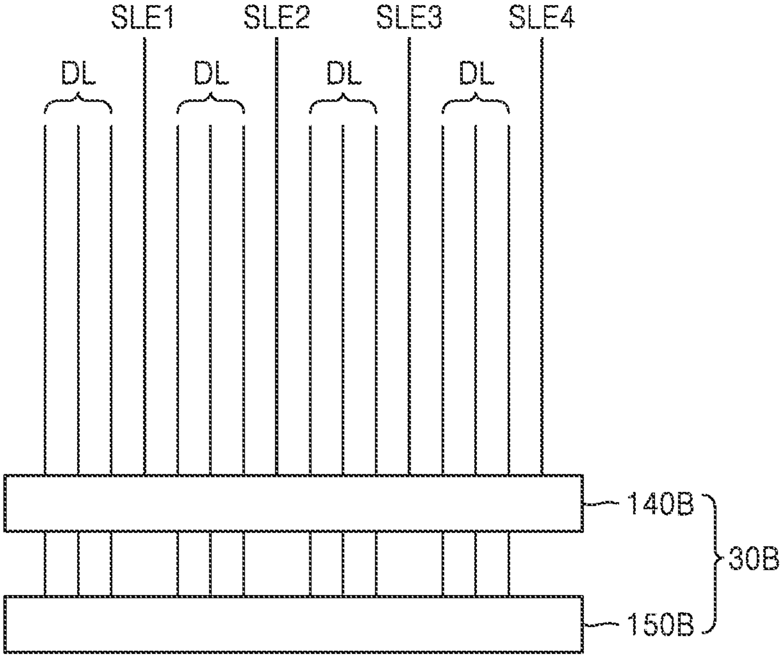

FIG. 3 is a block diagram illustrating a display apparatus according to an embodiment. FIG. 4 is a diagram schematically illustrating a portion of FIG. 3. FIG. 4 may be an enlarged view of a region A of FIG. 3. FIGS. 5A and 5B are diagrams schematically illustrating a driving circuit of FIG. 4.

Referring to FIGS. 3 and 4, a display apparatus 10 may include a display panel 110 and a plurality of driving circuits 30. The plurality of driving circuits 30 may correspond to certain areas of the display panel 110, and each driving circuit 30 may be connected to a plurality of data lines DL and a plurality of sensing lines SL arranged in the corresponding areas.

The display panel 110 may include a display area DA in which a plurality of pixels P is arranged and a peripheral area NDA outside the display area DA. The peripheral area NDA may be a type of non-display area in which pixels P are not arranged. The display area DA may be entirely surrounded by the peripheral area NDA.

Each of the plurality of driving circuits 30 may be mounted on a connection circuit board 40 of a film type, and the driving circuits 30 may be connected to each other by a sub circuit board 50. Each of connection circuit boards 40 may be connected to pads provided in the peripheral area NDA of the display panel 110.

Each of the connection circuit boards 40 may include a first connection circuit board 40A and a second connection circuit board 40B. The first connection circuit board 40A and the second connection circuit board 40B may be connected to a corresponding area of the display panel 110 to overlap each other in a plan view. A first driving circuit 30A may be mounted on the first connection circuit board 40A, and a second driving circuit 30B may be mounted on the second connection circuit board 40B. The driving circuit 30 includes the first driving circuit 30A and the second driving circuit 30B.

The first driving circuit 30A and the second driving circuit 30B may be connected to corresponding data lines DL and corresponding sensing lines SL arranged in a corresponding area of the display panel 110, respectively. The data lines DL and sensing lines SL arranged in each area of the display panel 110 may be classified into the data lines and sensing lines connected to the first driving circuit 30A and the data lines and sensing lines connected to the second driving circuit 30B. For example, it is assumed that an (n)th driving circuit 30 is connected corresponding to an (n)th area of the display panel 110, and the (n)th area includes an (n)th pixel column, an (n+1)th pixel column, an (n+2)th pixel column, an (n+3)th pixel column, an (n+4)th pixel column, an (n+5)th pixel column, an (n+6)th pixel column, and an (n+7)th pixel column, for example. The first driving circuit 30A of the (n)th driving circuit 30 may be connected to the data lines and sensing lines arranged in the (n)th pixel column, (n+1)th pixel column, (n+4)th pixel column, and (n+5)th pixel column. The second driving circuit 30B of the (n)th driving circuit 30 may be connected to the data lines and sensing lines arranged in the (n+2)th pixel column, (n+3)th pixel column, (n+6)th pixel column, and (n+7)th pixel column, for example.

The first driving circuit 30A and the second driving circuit 30B may extract characteristic information of a plurality of pixels P from a plurality of sensing lines respectively connected thereto and output a data signal generated based on the characteristic information to the plurality of pixels P.

Each of the first driving circuit 30A and the second driving circuit 30B may be an integrated circuit ("IC") and may include the sensor 140 and the data driver 150 illustrated in FIG. 1.

The pixel P may be a pixel for emitting light in a certain color. The plurality of pixels P may include a first pixel P1 for emitting light in a first color, a second pixel P2 for emitting light in a second color, and a third pixel P3 for emitting light in a third color. Each of the first to third pixels P1, P2, and P3 may include a display element. In the present embodiment, a set of the first pixel P1, the second pixel P2, and the third pixel P3 will be referred to as a unit pixel UP. The display element may be connected to a pixel circuit PC. The display element may include an organic light emitting diode or a quantum dot organic light emitting diode.

Unit pixels UP may be arranged in a first direction (x direction) and a second direction (y direction) in the display panel 110. That is, the first pixel P1, the second pixel P2, and the third pixel P3 may be alternately arranged in the first direction x. For example, the first pixels P1 may be arranged in a first sub column SC1, the second pixels P2 may be arranged in a second sub column SC2 adjacent to the first sub column SC1, and the third pixels SP3 may be arranged in a third sub column SC3 adjacent to the second sub column SC2. Hereinafter, the first to third sub columns SC1, SC2, and SC3 will be referred to as one pixel column. In FIG. 4, one driving circuit 30 corresponding to eight-pixel columns is illustrated for convenience of description; however, each driving circuit 30 according to the invention may be provided corresponding to eight or more pixel columns in another embodiment.

Each of the first to third pixels P1, P2, and P3 may be connected to a corresponding scan line among a plurality of scan lines GL and a corresponding data line among a plurality of data lines DL. For example, the first pixel P1 may be connected to a data line DL1 arranged in the first sub column SC1, the second pixel P2 may be connected to a data line DL2 arranged in the second sub column SC2, and the third pixel P3 may be connected to a data line DL3 arranged in the third sub column SC3.

Also, each of the first to third pixels P1, P2, and P3 may be connected to a corresponding control line among a plurality of control lines CL and a corresponding sensing line among a plurality of sensing lines SL. One control line CL may be provided in each pixel row, and the first to third pixels P1, P2 and P3 in the same pixel row constituting the unit pixel UP may share one control line CL. The first to third pixels P1, P2, and P3 that are adjacent in the first direction x and constitute the unit pixel UP in each pixel column may share one sensing line SL.

In an embodiment, for example, in the sensing period of the first pixel P1, when a scan signal and a control signal are applied to the scan line GL and the control line CL of the (k)th pixel row, respectively, the second transistor T2 and the third transistor T3 of each of the first to third pixels P1, P2, and P3 of the (k)th pixel row may be turned on to charge the capacitor Cst. In this case, a reference voltage may be supplied through the data line DL of the first pixel P1, which is to be sensed, to turn on the first transistor T1 of the first pixel P1, and a voltage (e.g., 0 voltage (V)) may be applied to the data lines DL of the second pixel P2 and the third pixel P3 to turn off the first transistors T1 of the second transistor T2 and the third transistor T3. Accordingly, one of the first to third pixels P1, P2, and P3 may be selectively connected to the sensing line SL at a time.

Each of the first driving circuit 30A and the second driving circuit 30B may be connected to the data lines and sensing lines arranged in a pair of adjacent pixel columns (two pixel columns) with another two pixel columns therebetween. In the display panel 110, the pixel columns corresponding to the first driving circuit 30A and the pixel columns corresponding to the second driving circuit 30B may be located alternately with each other. For example, the first driving circuit 30A may be connected to the data lines and sensing lines arranged in first, second, fifth, and sixth pixel columns, and the second driving circuit 30B may be connected to the data lines and sensing lines arranged in third, fourth, seventh, and eighth pixel columns.

FIG. 4 illustrates an example of the (n)th area as a portion of the display panel 110 and the (n)th driving circuit 30 connected corresponding to the (n)th area. Hereinafter, for convenience of description, the pixel columns of the (n)th area of the display panel 110 illustrated in FIG. 4 will be referred to as first to eighth pixel columns.

Also, among a pair of adjacent pixel columns, a left pixel column will be referred to as an odd pixel column and a right pixel column will be referred to as an even pixel column. Also, an odd pixel column and an even pixel column corresponding to the first driving circuit 30A will be referred to as a first odd pixel column CO1 and a first even pixel column CO2, respectively, and an odd pixel column and an even pixel column corresponding to the second driving circuit 30B will be referred to as a second odd pixel column CE1 and a second even pixel column CE2, respectively.

The first driving circuit 30A may be connected to data lines DL (DL1, DL2, and DL3) and sensing lines SLO (SLO1, SLO2, SLO3, and SLO4) arranged in the first and fifth pixel columns, that is, the first odd pixel columns CO1, and the second and sixth pixel columns, that is, the first even pixel columns CO2. In detail, the sensing lines SLO1, SLO2, SLO3, and SLO4 may be arranged in the first, second, fifth, and sixth pixel columns, respectively. The first driving circuit 30A may include a first sensor 140A connected to the sensing lines SLO and a first data driver 150A connected to the data lines DL.

The second driving circuit 30B may be connected to data lines DL (DL1, DL2, and DL3) and sensing lines SLE (SLE1, SLE2, SLE3, and SLE4) arranged in the third and seventh pixel columns, that is, the second odd pixel columns CE1, and the fourth and eighth pixel columns, that is, the second even pixel columns CE2. In detail, the sensing lines SLE1, SLE2, SLE3, and SLE4 may be arranged in the third, fourth, seventh, and eighth pixel columns, respectively. The second driving circuit 30B may include a second sensor 140B connected to the sensing lines SLE and a second data driver 150B connected to the data lines DL.

In the display panel 110, pads for connecting the display panel to the connection circuit board mounted with the driving circuit may be arranged in the peripheral area NDA, and in the case of a high-resolution panel, a short may occur between pads because the interval between pads decreases due to an increase in the number of pads. According to embodiments, the interval between adjacent pads may be secured by using two connection circuit boards.

Figure 6:
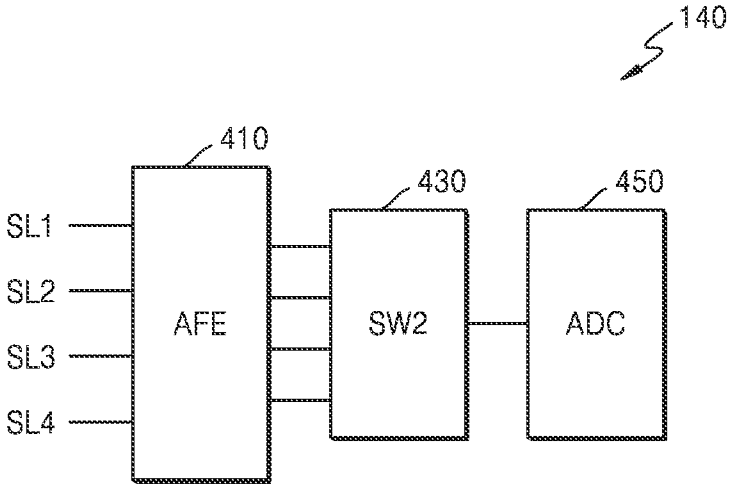
FIGS. 6 to 7B are diagrams schematically illustrating a sensor according to an embodiment.
Figure 7A:
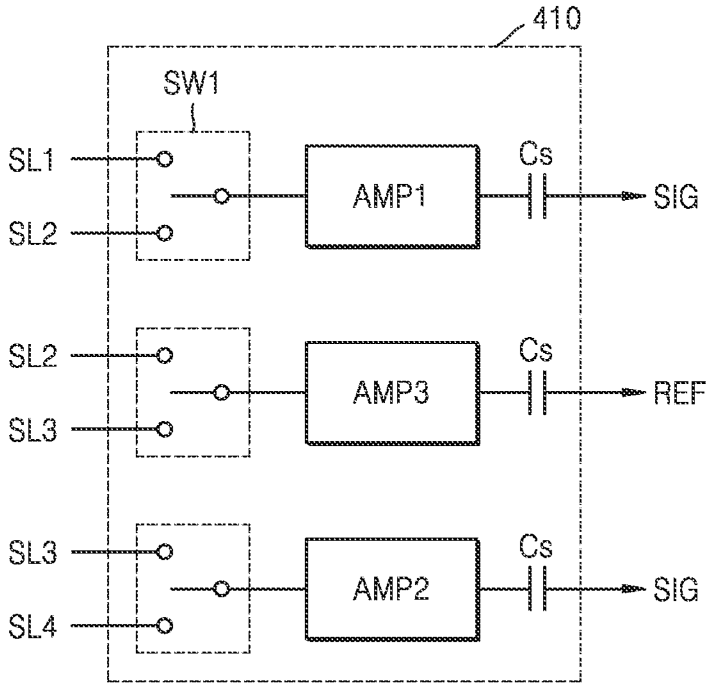
Figure 7B:
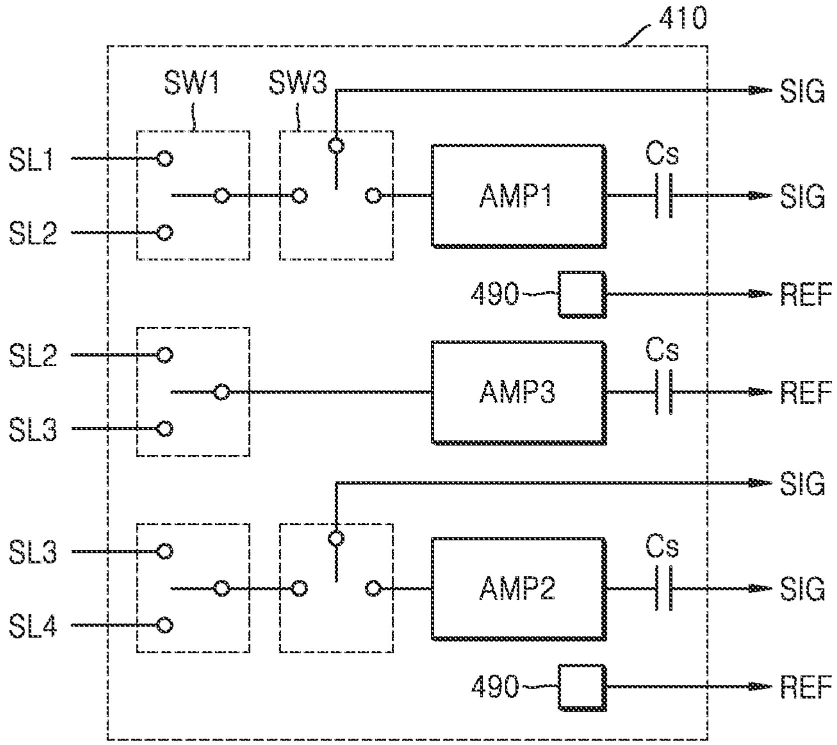
Figure 8A:
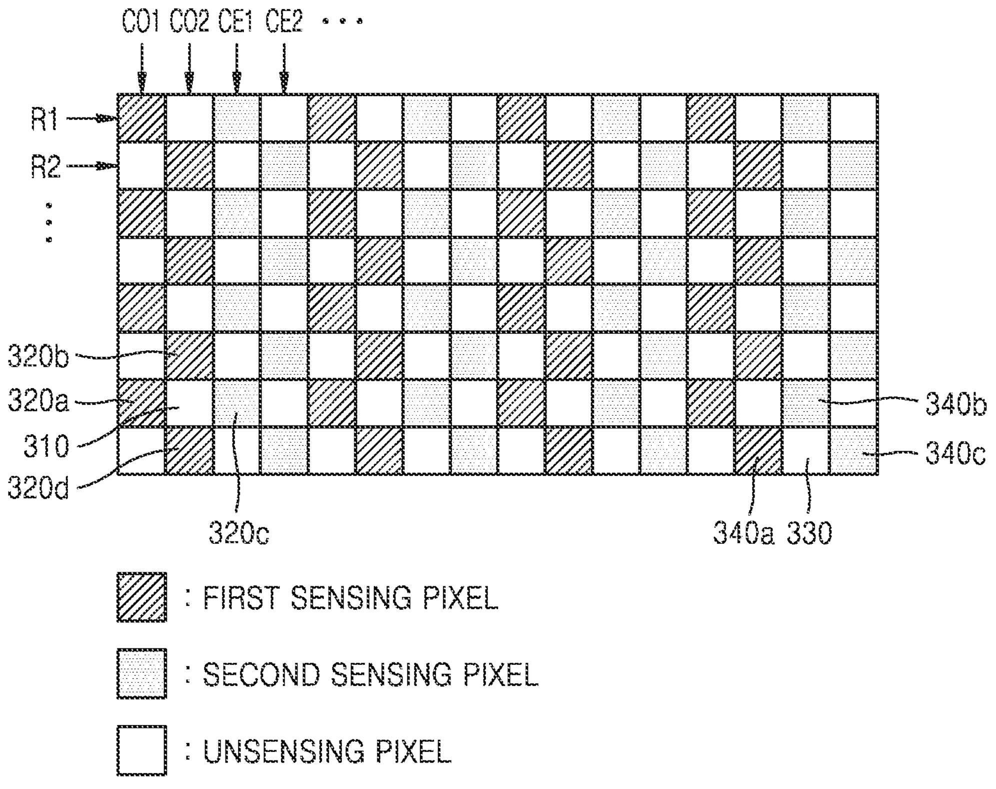
FIGS. 8A and 8B are diagrams illustrating sensing data.
Figure 8B:
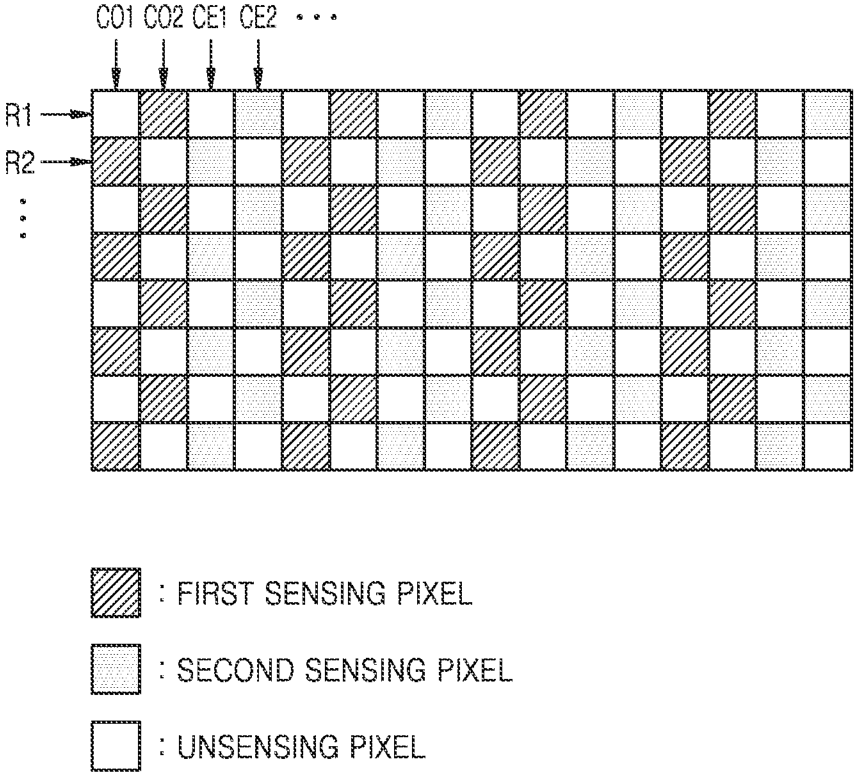

FIGS. 6, 7A, and 7B are diagrams schematically illustrating a sensor according to an embodiment. FIGS. 8A and 8B are diagrams illustrating sensing data. A sensor 140 illustrated in FIG. 6 may be the first sensor 140A of FIG. 5A or the second sensor 140B of FIG. 5B.

The sensor 140 may be implemented as a readout IC that extracts characteristic information of the pixels P. The sensor 140 may sense characteristic information of each color pixel that emits light in a particular color. For example, during the sensing period, the sensor 140 may sense characteristic information of the first pixels P1, characteristic information of the second pixels P2, and characteristic information of the third pixels P3 separately.

Referring to FIG. 6, the sensor 140 may include an analog front end ("AFE") 410 connected to a plurality of first to fourth sensing lines SL1 to SL4, an analog-to-digital converter (ADC) 450 connected to an output terminal of the AFE 410, and a second switch 430 connected between the AFE 410 and the ADC 450. The second switch 430 may be implemented as a switch matrix. The first to fourth sensing lines SL1 to SL4 may be sensing lines SLO1 to SLO4 connected to the first sensor 140A as illustrated in FIG. 5A. Alternatively, the first to fourth sensing lines SL1 to SL4 may be sensing lines SLE1 to SLE4 connected to the second sensor 140B as illustrated in FIG. 5B.

The AFE 410 may include a plurality of amplifiers and capacitors connected to sensing lines. Each amplifier may be selectively connected to a pair of sensing lines. For example, as illustrated in FIG. 7A, the AFE 410 may include a first amplifier AMP1, a second amplifier AMP2, and capacitors Cs connected to the first amplifier AMP1 and the second amplifier AMP2, respectively.

Each of the first amplifier AMP1 and the second amplifier AMP2 may be shared by a pair of sensing lines SL and may be selectively connected to one of the pair of sensing lines SL through a first switch SW1. For example, the first amplifier AMP1 may be shared by a first sensing line SL1 and a second sensing line SL2 and may be selectively connected to the first sensing line SL1 and the second sensing line SL2. The second amplifier AMP2 may be shared by a third sensing line SL3 and a fourth sensing line SL4 and may be selectively connected to the third sensing line SL3 and the fourth sensing line SL4. According to embodiments, the AFE 410 may not include an amplifier for each sensing line and two sensing lines may share one amplifier, thereby reducing the size of the driving circuit.

The sensor 140 may be driven in an odd-even sensing mode in which odd-numbered sensing lines and even-numbered sensing lines are alternately driven. In the odd-even sensing mode, when the pixels connected to an odd pixel row are selected, the sensing lines arranged in an odd pixel column may be connected to a corresponding amplifier, and when the pixels connected to an even pixel row are selected, the sensing lines arranged in an even pixel column may be connected to a corresponding amplifier.

For example, when an odd pixel row is selected, the first sensing line SL1 may be connected to the first amplifier AMP1 and the third sensing line SL3 may be connected to the second amplifier AMP2. The first amplifier AMP1 may output a signal SIG corresponding to the characteristic information of the pixel P input from the first sensing line SL1, and the second amplifier AMP2 may generate and output a signal SIG corresponding to the characteristic information of the pixel P input from the third sensing line SL3. Next, when an even pixel row is selected, the second sensing line SL2 may be connected to the first amplifier AMP1 and the fourth sensing line SL4 may be connected to the second amplifier AMP2. The first amplifier AMP1 may output a signal SIG corresponding to the characteristic information of the pixel P input from the second sensing line SL2, and the second amplifier AMP2 may generate and output a signal SIG corresponding to the characteristic information of the pixel P input from the fourth sensing line SL4.

The AFE 410 may further include a third amplifier AMP3 and a capacitor Cs connected to the third amplifier AMP3. The third amplifier AMP3 may be shared by the second sensing line SL2 and the third sensing line SL3 and may be selectively connected to the second sensing line SL2 and the third sensing line SL3. The third amplifier AMP3 may be connected to the sensing line SL arranged between the sensing lines SL connected to the first amplifier AMP1 and the second amplifier AMP2, to generate and output a reference signal REF for the signal SIG output by the first amplifier AMP1 and the second amplifier AMP2. For example, when the first amplifier AMP1 is connected to the first sensing line SL1 and the second amplifier AMP2 is connected to the third sensing line SL3 to operate, the third amplifier AMP3 may be connected to the second sensing line SL2 to operate. When the first amplifier AMP1 is connected to the second sensing line SL2 and the second amplifier AMP2 is connected to the fourth sensing line SL4 to operate, the third amplifier AMP3 may be connected to the third sensing line SL3 to operate.

In other embodiments, the AFE 410 may selectively use the amplifier according to the sensing mode. For example, as illustrated in FIG. 7B, the AFE 410 may further include a third switch SW3 and a power supply 490.

The AFE 410 may also operate in a second mode of using the first and second amplifiers AMP1 and AMP2 without using the third amplifier AMP3 and a third mode of using none of the first to third amplifiers AMP1, AMP2, and AMP3, in addition to a first mode (see FIG. 7A) of using all of the first to third amplifiers AMP1, AMP2, and AMP3.

In the second mode, as described with reference to FIG. 7A, the AFE 410 may generate and output a signal SIG corresponding to the characteristic information of the pixel P by using the first and second amplifiers AMP1 and AMP2, and a reference signal REF may be supplied by the power supply 490.

In the third mode, the AFE 410 may generate and output a signal SIG corresponding to the characteristic information of the pixel P without amplification by disconnecting the first and second amplifiers AMP1 and AMP2 from the sensing line by the third switch SW3, and a reference signal REF may be supplied by the power supply 490. In FIGS. 7A and 7B, the AFE 410 is connected to four sensing lines, but this is illustrated for convenience of description with reference to FIG. 4. The sensor 140 may be connected to four or more sensing lines, and the AFE 410 may be connected to four or more sensing lines and may include two or more amplifiers.

The second switch 430 may receive the output signal SIG and the reference signal REF and generate and output an input signal of the ADC 450. The ADC 450 may convert an analog input signal corresponding to the characteristic information input from the AFE 410 into digital sensing data and output the same to the compensator 170 (see FIG. 1).

FIG. 8A illustrates an example of a mapping diagram in which the sensing data corresponding to the characteristic information extracted from the pixels P by the first sensor 140A and the second sensor 140B illustrated in FIGS. 4 to 5B is mapped to the pixel according to the odd-even sensing mode. FIG. 8A may be a sensing data mapping diagram of the first pixels P1, a sensing data mapping diagram of the second pixels P2, or a sensing data mapping diagram of the third pixels P3.

In the odd-even sensing mode, the odd-numbered sensing lines (odd sensing lines) may read out the characteristic information of the pixel, and then, the even-numbered sensing lines (even sensing lines) may read out the characteristic information of the pixel. Also, the timing at which the odd sensing lines among the sensing lines connected to the first sensor 140A are connected to the amplifier may be equal to the timing at which the odd sensing lines among the sensing lines connected to the second sensor 140B are connected to the amplifier. Similarly, the timing at which the even sensing lines among the sensing lines connected to the first sensor 140A are connected to the amplifier may be equal to the timing at which the even sensing lines among the sensing lines connected to the second sensor 140B are connected to the amplifier.

For example, when odd pixel rows R1, R3, . . . are selected, the characteristic information of the pixels P connected to the odd-numbered sensing lines SLO (e.g., SLO1 and SLO3) arranged in the first odd pixel columns CO1 corresponding to the first sensor 140A and the even-numbered sensing lines SLE (e.g., SLE1 and SLE3) arranged in the second odd pixel columns CE1 corresponding to the second sensor 140B may be extracted. Next, when even pixel rows R2, R4, . . . are selected, the characteristic information of the pixels P connected to the even-numbered sensing lines SLO (e.g., SLO2 and SLO4) arranged in the first even pixel columns CO2 corresponding to the first sensor 140A and the even-numbered sensing lines SLE (e.g., SLE2 and SLE4) arranged in the second even pixel columns CE2 corresponding to the second sensor 140B may be extracted. Accordingly, as illustrated in FIG. 8A, the positions of the pixels P in the display panel 110, of which the characteristic information is extracted by the sensor 140, may have a grid shape.

In FIG. 8A, pixels of which the characteristic information is extracted by the first sensor 140A are represented as a first sensing pixel, and pixels of which the characteristic information is extracted by the second sensor 140B are represented as a second sensing pixel. Also, pixels of which the characteristic information is not extracted by the first sensor 140A and the second sensor 140B are represented as an unsensing pixel.

The sensing data of the unsensing pixel may be calculated based on the sensing data of the first sensing pixel and the second sensing pixel therearound and adjacent thereto. For example, the sensing data of an unsensing pixel 310 may be a value (e.g., an average value) obtained by interpolating the sensing data of the first and second sensing pixels 320*a*, 320*b*, 320*c*, and 320*d* therearound. Similarly, the sensing data of an unsensing pixel 330 may be a value obtained by interpolating the sensing data of the first and second sensing pixels 340*a*, 340*b*, and 340*c* therearound.

The compensator 170 may receive the sensing data output from the ADC 450. The compensator 170 may acquire the sensing data of all the pixels of the display panel 110 by 1:1 mapping the sensing data and the pixel. The compensator 170 may generate sensing data of an unsensing pixel by interpolating the sensing data of sensing pixels around the unsensing pixel. Accordingly, sensing data of all the pixels P may be acquired through one-time sensing and interpolation instead of two-time sensing with respect to an image of one frame, thus reducing a sensing time compared to two-time sensing.

The above embodiment is an embodiment in which sensing data is generated in the odd-even sensing mode; however, embodiments according to the invention are not limited thereto. In another embodiment, for example, as illustrated in FIG. 8B, the sensor 140 may be driven in an even-odd sensing mode in which even-numbered sensing lines and odd-numbered sensing lines are alternately driven. In the even-odd sensing mode, when the pixels connected to an odd pixel row are selected, even-numbered sensing lines may be connected to a corresponding amplifier, and when the pixels connected to an even pixel row are selected, odd-numbered sensing lines may be connected to a corresponding amplifier.

Figure 9:
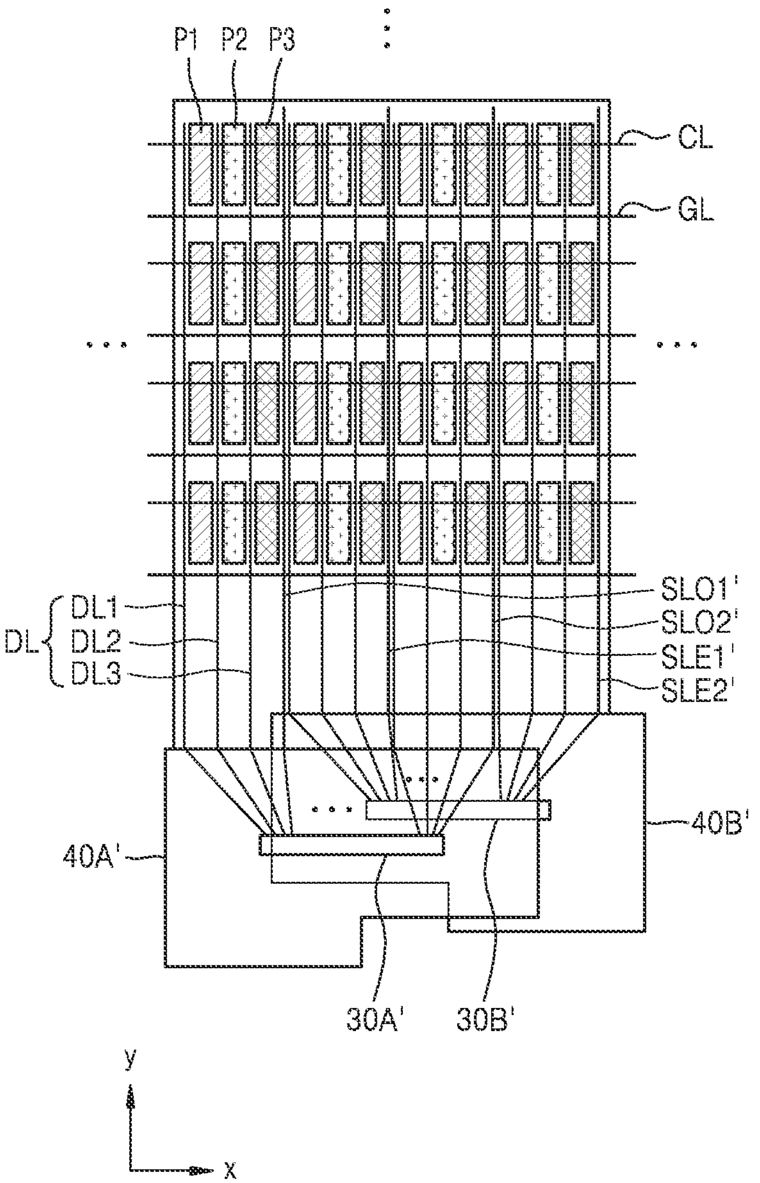
FIG. 9 is a diagram illustrating a portion of a display apparatus according to another embodiment.
Figure 10A:
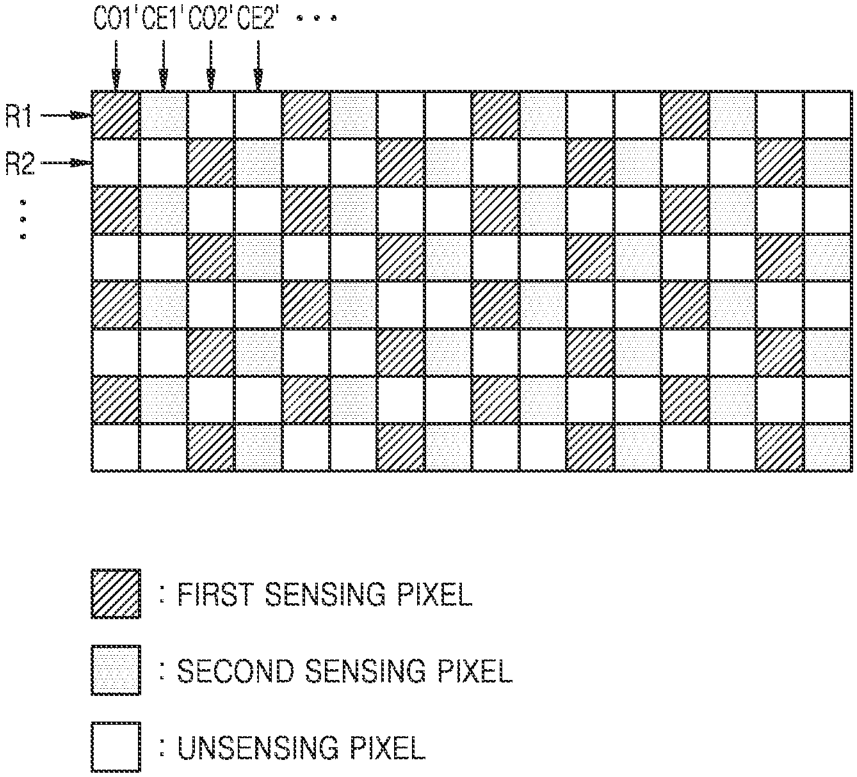
FIGS. 10A and 10B are diagrams illustrating sensing data of the display apparatus of FIG. 9.
Figure 10B:
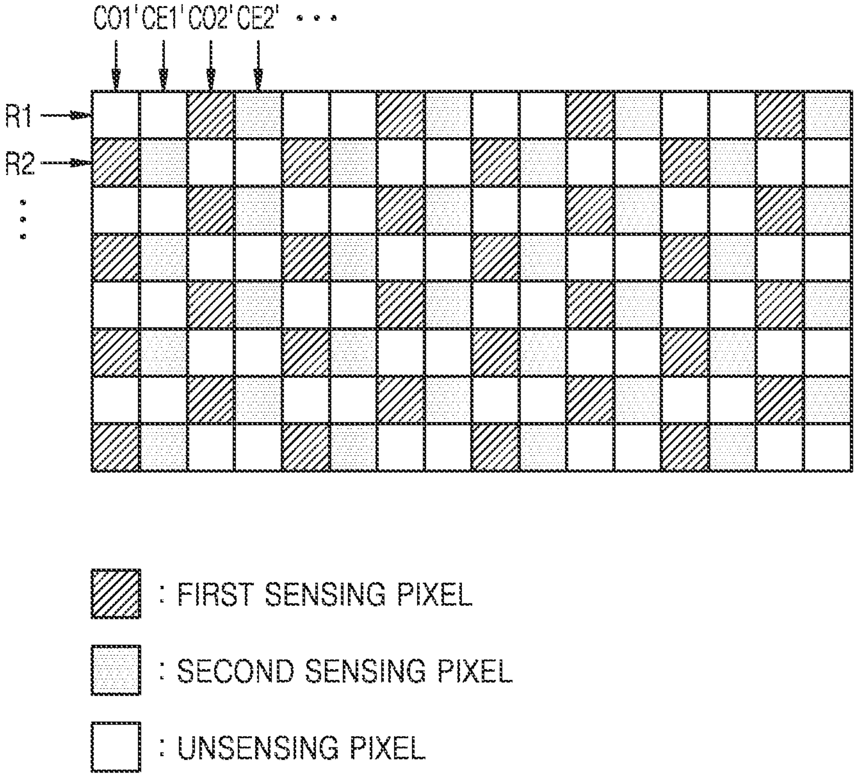

FIG. 9 is a diagram illustrating a portion of a display apparatus according to another embodiment. FIGS. 10A and 10B are diagrams illustrating sensing data of the display apparatus of FIG. 9. Hereinafter, differences from the embodiment illustrated in FIG. 4 will be mainly described.

Referring to FIG. 9, in the display apparatus according to an embodiment, a first driving circuit 30A' mounted on a first connection circuit board 40A' may be connected to sensing lines SLO1' and SLO2' and data lines DL of odd-numbered pixel columns of the display panel, and a second driving circuit 30B' mounted on a second connection circuit board 40B' may be connected to sensing lines SLE1' and SLE2' and data lines DL of even-numbered pixel columns thereof.

Referring to FIG. 10A, in the odd-even sensing mode, when odd pixel rows R1, . . . are selected, characteristic information of the pixels P connected to a sensing line (e.g., SLO1) of a first odd pixel column CO1' among the pixel columns corresponding to the first driving circuit 30A' and a sensing line (e.g., SLE1) of a second odd pixel column CE1' among the pixel columns corresponding to the second driving circuit 30B' may be extracted. Next, when even pixel rows R2, . . . are selected, characteristic information of the pixels P connected to a sensing line (e.g., SLO2) of a first even pixel column CO2' among the pixel columns corresponding to the first driving circuit 30A' and a sensing line (e.g., SLE3) of a second even pixel column CE2' among the pixel columns corresponding to the second driving circuit 30B' may be extracted.

In the embodiment of FIG. 9, when sensing data and pixels are mapped as illustrated in FIG. 10A, the positions of pixels among the pixels P of the display panel 110, of which the characteristic information is extracted by the first driving circuit 30A' and the second driving circuit 30B', may not have a grid shape. In this case, because 1:1 mapping of subpixels and sensing data should be performed by two-time sensing of odd-even sensing illustrated in FIG. 10A and even-odd sensing illustrated in FIG. 10B, the sensing time may increase by two times compared to the embodiment illustrated in FIG. 4.

In order for the display panel to display an image of uniform quality, each of the pixels should emit light uniformly in response to a data signal. For example, pixels supplied with a data signal of the same voltage should emit light of the same brightness. However, internal elements such as driving transistors and/or organic light emitting diodes included in each of the pixels may have unique characteristic values that may have a deviation, and the characteristic values thereof may change due to degradation thereof as the usage thereof increases. Thus, a characteristic deviation may occur between the pixels, and the characteristic deviation may cause the image quality degradation of the display panel.

According to embodiments, an image of uniform quality may be displayed on a display panel by effectively compensating for a characteristic deviation of pixels by extracting characteristic information of pixels through a plurality of sensing lines connected to pixels to correct a data signal output to pixels.

Also, according to embodiments, the positions of pads for connecting a driving circuit to lines may be adjusted by dividing the lines arranged in a high-resolution display panel into two groups and connecting the lines to the driving circuit on a group-by-group basis. Accordingly, the interval between the pads may be secured. Also, by an operation of the driving circuit in which two channels (i.e., two sensing lines) share one amplifier, sensing data of a pixel of which the characteristic information is not extracted may be calculated based on sensing data of adjacent pixels, in one-time sensing. Thus, sensing data of all pixels may be generated without two-time sensing such that a sensing time may be reduced.

The display apparatus according to an embodiment may display an image of uniform quality on a display panel by effectively compensating for a characteristic deviation of pixels. However, these effects are merely examples and the scope of the disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:

a display panel in which a plurality of rows of a first direction and a plurality of columns of a second direction are defined, and a pair of a first odd pixel column and a first even pixel column and a pair of a second odd pixel column and a second even pixel column are alternately defined in the first direction;

a first driving circuit extracts characteristic information of a plurality of pixels arranged in a plurality of first odd pixel columns and a plurality of first even pixel columns of the display panel, and a second driving circuit extracts characteristic information of a plurality of pixels arranged in a plurality of second odd pixel columns and a plurality of second even pixel columns of the display panel.

2. The display apparatus of claim 1, wherein the display panel comprises a plurality of sensing lines connected to the plurality of pixels, and wherein the first driving circuit is connected to sensing lines disposed in the first odd pixel columns and the first even pixel columns among the plurality of sensing lines, and the second driving circuit is connected to sensing lines disposed in the second odd pixel columns and the second even pixel columns among the plurality of sensing lines.

3. The display apparatus of claim 2, wherein each of the plurality of pixels includes a first pixel and a second pixel that emit light in different colors and are arranged adjacent to each other in the first direction, and the first pixel and the second pixel is selectively connected to a sensing line of the plurality of sensing lines.

4. The display apparatus of claim 3, wherein the display panel comprises a plurality of data lines connected to the plurality of pixels, and wherein the first driving circuit is connected to data lines disposed in the first odd pixel columns and the first even pixel columns, and the second driving circuit is connected to data lines disposed in the second odd pixel columns and the second even pixel columns.

5. The display apparatus of claim 4, wherein each of the first pixel and the second pixel is connected to a data line of the plurality data lines.

6. The display apparatus of claim 1, wherein the first driving circuit outputs data signals to the plurality of pixels arranged in the first odd pixel columns and the first even pixel columns of the display panel, and the second driving circuit outputs data signals to the plurality of pixels arranged in the second odd pixel columns and the second even pixel columns of the display panel.

7. The display apparatus of claim 6, wherein the data signals correspond to a second data generated by converting a first data based on sensing data corresponding to the characteristic information.

8. The display apparatus of claim 7, wherein sensing data of an unsensing pixel among the plurality of pixels, are generated based on sensing data of pixels adjacent to the unsensing pixel among the plurality of pixels, and the unsensing pixel is a pixel of which the characteristic information is not extracted.

9. The display apparatus of claim 6, wherein the first driving circuit includes a first sensor connected to sensing lines disposed in the first odd pixel columns and the first even pixel columns, and a first data driver connected to data lines disposed in the first odd pixel columns and the first even pixel columns, and the second driving circuit includes a second sensor connected to sensing lines disposed in the second odd pixel columns and the second even pixel columns, and a second data driver connected to data lines disposed in the second odd pixel columns and the second even pixel columns.

10. The display apparatus of claim 1, wherein the first driving circuit includes a first amplifier selectively connected to a sensing line arranged in the first odd pixel column and a sensing line arranged in the first even pixel column of the plurality of sensing lines, and the second driving circuit includes a second amplifier selectively connected to a sensing line arranged in the first even pixel column and a sensing line arranged in the second even pixel column of the plurality of sensing lines.

11. The display apparatus of claim 10, wherein a timing at which the sensing line arranged in the first odd pixel column is connected to the first amplifier is equal to a timing at which the sensing line arranged in the second odd pixel column is connected to the second amplifier, and a timing at which the sensing line arranged in the first even pixel column is connected to the first amplifier is equal to a timing at which the sensing line arranged in the second even pixel column is connected to the second amplifier.

12. The display apparatus of claim 1, wherein the characteristic information includes at least one of threshold voltage, mobility, and degradation information of a driving transistor and an organic light emitting diode included in each of the plurality of pixels.

13. The display apparatus of claim 1, wherein the first driving circuit is mounted on a first circuit board of a film type, and the second driving circuit is mounted on a second circuit board of a film type.

* * * * *